3,134,676
ANIMAL FEED COMPOSITIONS AND METHODS
FOR THEIR ADMINISTRATION
Theodore Ellison, Rydal, Pa., assignor to Smith Kline &
French Laboratories, Philadelphia, Pa., a corporation
of Pennsylvania
No Drawing. Filed June 21, 1961, Ser. No. 118,520
8 Claims. (Cl. 99—2)

This invention relates to animal feed compositions and methods for increasing the meat-producing potential of such feeds. More particularly it relates to animal feed compositions containing 2-phenylcyclopropylamine and derivatives thereof, as well as to methods for the use of such feed compositions to increase the rate of growth of commercially important animals.

The compositions embraced within the present invention are characterized in that they contain small amounts of a compound or compounds having the formula:

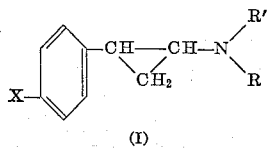

(I)

wherein X may be hydrogen, halogen, or trifluoromethyl; R and R' may be hydrogen or lower alkyl.

In particular X may be a halogen atom such as chloro, fluoro, bromo or iodo, as well as a hydrogen or trifluoromethyl group. Also embraced within the present invention are the pharmacologically acceptable acid addition salts of the amines of these compounds such as the chloride, sulfate, citrate, tartrate, maleate, mandelate and the like. It is to be noted that the physiological properties of these novel compositions embracing these salts are a manifestation of the phenylcyclopropylamine compounds and not the particular anion of these salts. Thus the acid employed within these salts can be widely varied so long as it is one which is pharmacologically and physically acceptable. The above phenylcyclopropylamine compounds may exist in either the cis or trans configuration and both isomers are embraced within the scope of this invention. While both isomers exhibit the novel properties herein described, it is generally not necessary to isolate the individual isomeric forms. Rather a mixture may be administered which contains both isomers.

The phenylcyclopropylamine compound employed in these novel compositions when administered in specific and discrete concentrations to livestock such as sheep, cattle, swine, chickens, turkeys and the like, demonstrate an ability to increase the rate of growth of such animals and to improve the feed efficiency of the compositions. Furthermore, these compounds are quickly metabolized and leave no detectable residue. Consequently these compositions afford a more rapid growth to the desired weight level of the particular animal together with an economy of feed.

I have discovered that these desired results are realized when these compounds are administered in concentrations of from 1 part-per-million to 100 parts-per-million and preferably in the range from 5 parts-per-million to 50 parts-per-million. At these extremely low levels, a surprisingly high increase in rate of growth is observed. The compositions may be prepared by mixing the compound directly with the basal feed ration itself or alternatively by employing a suitable premix composition which is introduced to and mixed in known properties with a standard basal feed ration. Since the concentrations at which these compounds are operative as growth stimulants are relatively low, it is generally advantageous for purposes of accurate measurement, to administer them in the form of a premix. Such a premix comprises an edible carrier such as grain derived carrier, meals, as for example corn meal or soybean meal or various carbohydrate carriers such as sucrose or starch.

The increase rate of gain and feed efficiency in poultry and other meat-producing animals which results from the administration of these compounds is observed in the presence of various other growth stimulating factors, as for example various antibiotics or tranquilizers, in each case a significant increase in rate of gain and/or feed efficiency over the controlled animals being observed.

The compounds embraced by these compositions represented by Formula I when X represents halogen or trifluoromethyl are specifically disclaimed from my invention which in itself relates to novel feed compositions and methods for increasing the rate of growth of meat-producing animals.

The following examples are representative of the compositions of this invention and methods for their administration, as well as the marked advantages over feed additives heretofore employed. These examples should not however be construed as limiting the scope of my invention, the scope being defined only by the appended claims.

*Example 1*

4-chlorostyrene (48.5 g.) and 70.0 g. of ethyl diazoacetate are mixed carefully at 0° C. and the resultant mixture is then gradually heated to 160° C. The reaction is maintained at this temperature by alternate heating and cooling as required. After the initial exothermic reaction is completed, the temperature is maintained at approximately 160° C. for four hours. The mixture is then distilled under reduced pressure and the fraction, B.P. 126–165° C. at 1–2 mm., is collected. The above fraction is redistilled through a 12″ Vigreux column to yield two fractions, cis-ethyl 2-(4-chlorophenyl)-cyclopropanecarboxylate, B.P. 121–126°/0.8 mm., and trans-ethyl 2-(4-chlorophenyl)-cyclopropanecarboxylate, B.P. 136–140°/0.8 mm.

To 7.6 g. of trans-ethyl 2-(4-chlorophenyl)-cyclopropanecarboxylate is added a solution of 5.7 g. of potassium hydroxide in 5.7 ml. of water and 25 ml. of 95% ethanol. The resulting solution is refluxed for four hours and then concentrated in vacuo. The residue is dissolved in 40 ml. of water and the solution adjusted to pH 1 with 10% hydrochloric acid solution. The solid which forms is recrystallized from boiling water to yield trans 2 - (4 - chlorophenyl)-cyclopropanecarboxylic acid, M.P. 114–116° C.

A mixture of 54.0 g. of trans 2-(4-chlorophenyl)-cyclopropanecarboxylic acid and 75 ml. of thionyl chloride is allowed to stand at room temperature for 20 hours. Excess thionyl chloride is removed in vacuo, after which 25 ml. of benzene are added and then evaporated, thereby removing the last traces of thionyl chloride. The residue is distilled under reduced pressure to yield trans-2-(4-chlorophenyl)-cyclopropanecarbonyl chloride, B.P. 131–133/1–4 mm.

To 22.5 g. of sodium azide are added 75 ml. of dry toluene. This mixture is heated gradually while a solution of 18.0 g. of trans-2-(4-chlorophenyl)-cyclopropanecarbonyl chloride in 75 ml. of dry toluene is added slowly over a period of 15 minutes. The mixture is then refluxed for three hours, cooled, and any solid removed by filtration. The filtrate is evaporated in vacuo to leave the isocyanate as a red oil. This oil is cooled and to it are added 150 ml. of concentrated hydrochloric acid. The mixture is stirred at reflux for 20 hours. The resulting solution is then concentrated in vacuo to give a crystalline residue of the hydrochloride salt. Recrystallization from ethanol-ether affords trans-2-(4-chlorophenyl)-cyclopropylamine hydrochloride, M.P. 192–195° C.

The free base is liberated from the above hydrochloride salt by addition to an aqueous solution of the salt of dilute aqueous alkali. This neutralized solution is extracted with benzene and the benzene extracts then evaporated to yield trans-2-(4 - chlorophenyl) - cyclopropylamine which may be further purified by distillation at reduced pressures.

The free base is also converted to the succinate salt by treating an ethereal solution of the base with a saturated ethereal solution of succinic acid.

*Example 2*

4-bromostyrene (18.3 g.) and 20.0 g. of ethyl diazoacetate are mixed carefully at 0° C. The mixture is heated gradually to 160° C. and the temperature maintained at this level for six hours. The mixture is then distilled under reduced pressure and the main fraction consisting of ethyl 2-(4-bromophenyl)-cyclopropanecarboxylate is collected.

A mixture of 26.9 g. of ethyl 2-(4-bromophenyl)-cyclopropanecarboxylate, 20.0 g. of potassium hydroxide, 20 ml. of water and 90 ml. of 95% ethanol is heated at reflux for four hours. The solvents are then removed in vacuo and the residue so obtained is dissolved in water which is then adjusted to pH 1 with concentrated hydrochloric acid. The solid which forms is collected by filtration and recrystallized from water to yield trans-2-(4-bromophenyl)-cyclopropanecarboxylic acid.

The mother liquor from the above aqueous recrystallization is concentrated in vacuo to yield cis-2-(4-bromophenyl)-cyclopropanecarboxylic acid.

An ethereal solution of diazomethane is added up in several portions to a suspension of 10.0 g. of cis-2-(4-bromophenyl)-cyclopropanecarboxylic acid in 150 ml. of absolute ether, until a yellow color persists. After standing at room temperature for 24 hours, the excess diazomethane is decomposed by addition of ethereal hydrogen chloride. The dried ethereal solution is concentrated in vacuo to yield cis-methyl - 2 - (4-bromophenyl)-cyclopropanecarboxylate.

To a solution of 10.5 g. of the above methyl ester in 20 ml. of absolute ethanol, is added 100 ml. of 100% hydrazine hydrate and the mixture then refluxed for five hours. After standing for 18 hours at room temperature, the solution is concentrated in vacuo to yield cis-2-(4-bromophenyl)-cyclopropanecarboxylic acid hydrazide.

The above hydrazide (12.7 g.) is dissolved in 250 ml. of 5% hydrochloric acid and a solution of 3.5 g. of sodium nitrite in 40 ml. of water is added slowly, with the temperature being maintained at 0° C. The cooled solution is then extracted with toluene and the combined extracts dried and concentrated in vacuo. Absolute methanol (250 ml.) is added to the toluene solution and the solution refluxed for five hours. The solvents are removed in vacuo to yield cis-2 - (4 - bromophenyl) - cyclopropylmethyl urethan.

The above methyl urethan (13.5 g.) and 600 ml. of a saturated methanolic solution of barium hydroxide octahydrate are refluxed for 36 hours. The mixture is cooled to 0° C., filtered and the filtrate concentrated to dryness in vacuo to yield cis-2 - (4 - bromophenyl) - cyclopropylamine.

The oily primary amine obtained above is disssolved in ethyl acetate and reacted with an ethyl acetate solution of maleic acid to furnish cis-2-(4-bromophenyl)-cyclopropylamine maleate.

*Example 3*

A solution of 8.4 g. of trans-2-(4-chlorophenyl)-cyclopropylamine (prepared as in Example 1) and 5.6 g. of benzaldehyde in 20 ml. of absolute ethanol is heated at reflux for four hours. The solvent is removed in vacuo to yield the benzal derivative.

A mixture of 7.7 g. of trans-2-(4-chlorophenyl)-cyclopropylbenzalamine and 8.6 g. of methyl iodide is heated in a sealed tube at 100° C. for eight hours. The reaction product is then heated with 100 ml. of 95% ethanol for four hours and the solvent removed in vacuo. The mixture is then treated with 40% potassium hydroxide solution and extracted with ether. The dried ether extract is evaporated to yield trans-2-(4-chlorophenyl)-cyclopropylmethylamine.

An ethereal solution of the free base is treated with ethereal hydrogen chloride to yield the hydrochloride salt.

*Example 4*

A 40% aqueous solution of formaldehyde (5.1 g.) is added to a cooled solution of 4.2 g. of cis-2-(4-bromophenyl)-cyclopropylamine (prepared as in Example 2) in 6.6 g. of 90% formic acid, and the mixture refluxed for 18 hours. The cooled reaction mixture is treated with 2.7 ml. of concentrated hydrochloric acid and the solution evaporated in vacuo. The residue is made alkaline with 50% potassium hydroxide solution and the solution extracted with ether. The dried ether extracts are evaporated to give the residual cis-2-(4-bromophenyl)-cyclopropyldimethylamine.

The free base dissolved in ethyl acetate is added to a solution of mandelic acid in ethanol. Concentration of the resulting solution and cooling yields the crystalline cis - 2 - (4 - bromophenyl) - cyclopropyldimethylamine mandelate.

*Example 5*

4-trifluoromethylstyrene (30.0 g.) and 35.0 g. of ethyl diazoacetate are mixed at 0° C. and gradually heated to 150° C. The temperature is maintained at this level for three hours and the mixture is then distilled under reduced pressure. The main fraction collected consists of ethyl 2 - (4 - trifluoromethylphenyl) - cyclopropanecarboxylate.

A solution of 11.5 g. of potassium hydroxide in 12 ml. of water and 50 ml. of 95% ethanol is added to 17.6 g. of ethyl 2 - (4 - trifluoromethylphenyl)-cyclopropanecarboxylate. The solution is refluxed for four hours and processed as described in Example 1. There is thus obtained after fractional recrystallization the separated isomeric cis and trans-2-(4-trifluoromethylphenyl)-cyclopropanecarboxylic acids.

Following the general procedure outlined in Example 1, trans - 2 - (4 - trifluoromethylphenyl)-cyclopropanecarboxylic acid is esterified with an ethereal solution of diazomethane; the method ester converted to the acid hydrazide with 100% hydrazine hydrate in ethanol; the hydrazide diazotized and decomposed by heating in a toluene-methanol solution to the methyl urethan; and the urethan hydrolyzed with a saturated methanolic solution of barium hydroxide octahydrate to yield trans-2-(4-trifluoromethylphenyl)-cyclopropylamine.

The primary amine obtained as above is dissolved in absolute ether and treated with ethereal hydrogen chloride to give trans 2 - (4 - trifluoromethylphenyl)-cyclopropylamine hydrochloride.

Example 6

| Ingredient: | Quantity |
|---|---|
| Ground yellow corn _____lbs__ | 1139 |
| Stabilized fat _____lbs__ | 120 |
| Fish meal, 60% _____lbs__ | 125 |
| Soybean meal, 50% _____lbs__ | 480 |
| Corn gluten meal _____lbs__ | 50 |
| Dehydrated alfalfa meal, 20% _____lbs__ | 25 |
| Limestone _____lbs__ | 20 |
| Dicalcium phosphate _____lbs__ | 28 |
| Salt _____lbs__ | 6 |
| Trace mineral mix [1] _____lbs__ | 2 |
| Vitamin-amino acid mix [2] _____lbs__ | 5 |
| Trans - 2 - phenylcyclopropylamine hydrochloride _____g__ | 18.18 |

[1] Trace mineral mix contains manganese 60 p.p.m.; iodine 1.2 p.p.m.; copper 2 p.p.m.; cobalt 4 p.p.m.; iron 25 p.p.m. and zinc 18 p.p.m.
[2] Vitamin-amino acid mix contains riboflavin 4 g.; niacin 30 g.; calcium pantothenate 10 g.; choline chloride 1.5 lbs.; vitamin $B_{12}$ (1000 mcg./g.) 6 g.; vitamin A acetate (500,000 U.S.P. units/g.) 6 g.; vitamin $D_2$ (850,000 I.C.U./g.) 1 g.; vitamin E acetate (250 I.U./g.) 5 g.; DL-methionine 1.0 lb.; corn meal to a total of 5 lbs.

The above ingredients are thoroughly mixed and employed as a feed composition for chickens.

Example 7

| Ingredient: | Quantity |
|---|---|
| Ground yellow corn _____lbs__ | 808 |
| Rolled oats _____lbs__ | 400 |
| Sugar _____lbs__ | 100 |
| Solvent soybean meal _____lbs__ | 360 |
| Dried skim milk _____lbs__ | 200 |
| Menhaden fish meal _____lbs__ | 50 |
| Dried corn distillers' solubles _____lbs__ | 50 |
| Ground limestone _____lbs__ | 10 |
| Salt _____lbs__ | 10 |
| Trace mineral mix _____lbs__ | 4 |
| Vitamin-amino acid mix _____lbs__ | 8 |
| 2-phenylcyclopropylamine maleate _____g__ | 9.1 |

The above ingredients are mixed and employed as a suitable started formula for swine.

Example 8

To 0.99 lb. of ground yellow corn meal is added 5 g. of 2-phenylcyclopropylamine hydrochloride. The resulting premix composition is then added to one ton of standard swine feed, thereby affording five parts of 2-phenylcyclopropylamine hydrochloride per million parts of feed.

Example 9

| Ingredient: | Quantity |
|---|---|
| Corn _____lb__ | 0.88 |
| Soybean oil meal _____lb__ | 0.10 |
| Bone meal _____lb__ | 0.01 |
| Salt _____lb__ | 0.01 |
| Trans-2-(4-chlorophenyl) - cyclopropylmethylamine _____mg__ | 12.5 |

The above ingredients when mixed are employed as sheep feed concentrate. Approximately 2.0 lbs. of such a feed concentrate is administered daily, allowing animals to further consume hay, generally about 4–6 lbs. daily. By employing the above concentrates such sheep will receive approximately 25 mg. of phenylcyclopropylamine derivative when consuming a feed ration of from 6–8 lbs.

Example 10

| Ingredient: | Quantity |
|---|---|
| Wheat meal _____lbs__ | 5 |
| Milk powder _____lbs__ | 2 |
| Liver meal _____lb__ | 1 |
| Fish meal _____lbs__ | 6 |
| Meat meal _____lbs__ | 5 |
| Extracted soybean meal _____lbs__ | 6 |
| Extracted sunflower meal _____lbs__ | 6 |
| Millet _____lbs__ | 30 |
| Corn meal _____lbs__ | 29 |
| Oat meal _____lbs__ | 5 |
| Trace mineral mix _____lbs__ | 2 |
| Vitamin-amino acid _____lbs__ | 3 |
| Cis - 2 - (4-bromophenyl)-cyclopropyldimethylamine mandelate _____mg__ | 4.5 |

Such a composition is employed as a feed mixture for a commercial common breed of broiler chicks.

Example 11

| Ingredients: | Quantity |
|---|---|
| Fine ground yellow corn _____lbs__ | 564.8 |
| 44% solvated soybean meal _____lbs__ | 269.4 |
| Corn gluten meal _____lbs__ | 25.0 |
| Alfalfa meal, 17% dehydrated _____lbs__ | 20.0 |
| Stabilized animal fat _____lbs__ | 15.0 |
| Fish meal _____lbs__ | 40.0 |
| Dried corn distillers' solubles _____lbs__ | 10.0 |
| Dried whey (50% delactosed) _____lbs__ | 10.0 |
| Dried brewers' yeast _____lbs__ | 15.0 |
| Iodized salt _____lbs__ | 4.0 |
| Calcium carbonate _____lbs__ | 13.0 |
| Calcium phosphate _____lbs__ | 10.0 |
| Delamix _____lb__ | 1.0 |
| DL-methionine _____lb__ | .1 |
| Vitamin A (10,000 I.U./g.) _____lb__ | .5 |
| Vitamin $B_{12}$ _____lb__ | .2 |
| Vitamin $D_3$ (3,000 I.C.U./g.) _____lb__ | .25 |
| Riboflavin _____lb__ | .5 |
| DL-calcium pantothenate (45%) _____lb__ | .01 |
| Niacin _____lb__ | .25 |
| Choline chloride (25%) _____lbs__ | 1.25 |
| 2 - (4 - trifluoromethylphenyl) - cyclopropylamine hydrochloride _____g__ | 45.45 |

Such a composition as is above described is suitable as feed for turkey poults.

Example 12

| Ingredients: | Quantity |
|---|---|
| Soybean meal _____lbs__ | 325 |
| Omalas _____lbs__ | 40 |
| Dicalcium sulfate _____lbs__ | 16 |
| Feeding limestone _____lbs__ | 12 |
| Stilbestrol _____lbs__ | 2 |
| Trace mineral premix _____lb__ | 1 |
| Vitamin A (2 M/lbs.) _____lb__ | 1 |
| 2-phenylcyclopropylamine maleate _____g__ | 2.3 |

The above ingredients are thoroughly mixed and 2 lbs. of this supplement plus 2 lbs. of hay are allotted to heifers allowing full feed on ground corn or corn meal.

Example 13

| Ingredients: | Quantity |
|---|---|
| Corn silage _____lbs__ | 150 |
| Alfalfa hay _____lbs__ | 30 |
| Corn sorghum _____lbs__ | 130 |
| Cotton seed meal _____lb__ | 1 |
| 2-phenylcyclopropylamine _____g__ | .75 |

The above composition is suitable for a fattening ration for yearling beef cattle.

Example 14

A feed composition as described in Example 6 was employed as the feed for 50 Vantress X Arbor Acre cockerels. An identical basal feed ration without 2- phenylcyclopropylamine was employed as a control and administered to an additional 50 cockerels.

| Weeks | Control | | 2-Phenylcyclo-propylamine Hydrochloride | | Increase over Control, percent |
|---|---|---|---|---|---|
| | Average Total Wt., g. | Gain, g. | Average Total Wt., g. | Gain, g. | |
| 0 | 76.8 | | 76.7 | | |
| 1 | 180.6 | 103.8 | 176.7 | 100.0 | |
| 2 | 310.5 | 233.7 | 325.4 | 248.7 | 6.4 |
| 3 | 425.2 | 348.4 | 469.8 | 393.1 | 12.8 |
| 4 | 472.9 | 396.1 | 574.7 | 498.0 | 25.7 |

I claim:

1. An improved feed for meat-producing animals comprising a basal feed ration combined uniformly with from about 1 part-per-million to about 100 parts-per-million of a member selected from the group consisting of the compound having the formula:

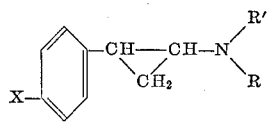

wherein X is a member selected from the group consisting of hydrogen, halogen, and trifluoromethyl; and R and R' are members selected from the group consisting of hydrogen and lower alkyl, and the non-toxic pharmacologically acceptable acid addition salts thereof.

2. An improved feed for meat-producing animals comprising a basal feed ration combined uniformly with from about 5 parts-per-million to about 50 parts-per-million of a member selected from the group consisting of the compound having the formula:

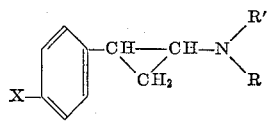

wherein X is a member selected from the group consisting of hydrogen, halogen, and trifluoromethyl; and R and R' are members selected from the group consisting of hydrogen and lower alkyl, and the non-toxic pharmacologically acceptable acid addition salts thereof.

3. An improved feed for meat-producing animals comprising a basal feed ration combined uniformly with from about 1 part-per-million to about 100 parts-per-million of a member selected from the group consisting of 2-phenylcyclopropylamine and the non-toxic pharmacologically acceptable acid addition salts thereof.

4. An improved feed for meat-producing animals comprising a basal feed ration combined uniformly with from about 5 parts-per-million to about 50 parts-per-million of a member selected from the group consisting of 2-phenylcyclopropylamine and the non-toxic pharmacologically acceptable acid addition salts thereof.

5. A premix composition to be combined uniformly and in known ratios with the basal feed rations of meat-producing animals comprising a grain derived meal carrier and a growth promoting compound selected from the group consisting of an amine having the formula:

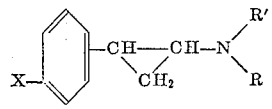

wherein X is a member selected from the group consisting of hydrogen, halogen, and trifluoromethyl; and R and R' are members selected from the group consisting of hydrogen and lower alkyl, and the non-toxic pharmacologically acceptable acid addition salts thereof, wherein said growth promoting compound is present in sufficient quantities to afford a final ratio of from about 1 part-per-million to about 100 parts-per-million when combined with said basal feed ration.

6. A premix composition to be combined uniformly and in known ratios with the basal feed rations of meat-producing animals comprising a grain derived meal carrier and a growth promoting compound selected from the group consisting of 2-phenylcyclopropylamine and the non-toxic pharmacologically acceptable acid addition salts thereof, wherein said growth promoting compound is present in sufficient quantities to afford a final ratio of from about 5 parts-per-million to about 50 parts-per-million when combined with said basal feed ration.

7. The method of increasing the rate of growth of meat-producing animals comprising uniformly dispersing a member selected from the group consisting of a compound having the formula:

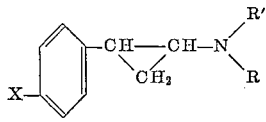

wherein X is a member selected from the group consisting of hydrogen, halogen, and trifluoromethyl; and R and R' are members selected from the group consisting of hydrogen and lower alkyl, and the non-toxic pharmacologically acceptable acid addition salts thereof in the basal feed ration of said animals at a concentration of from about 1 part-per-million to about 100 parts-per-million and orally administering said feed to said meat-producing animals.

8. The method of increasing the rate of growth of meat-producing animals comprising uniformly dispersing a member of the group consisting of 2-phenylcyclopropylamine and the non-toxic pharmacologically acceptable acid addition salts thereof in the basal feed ration of said animals at a concentration of from about 5 parts-per-million to about 50 parts-per-million and orally administering said feed to said meat-producing animals.

References Cited in the file of this patent

UNITED STATES PATENTS 3,011,945     Bolling et al.     Dec. 5, 1961
3,079,403     Weinstock     Feb. 26, 1963

OTHER REFERENCES

Barnard et al.: Lancet, vol. 11, October 1957, pp. 804 and 805.

Wornick: Cereal Science, vol. 3, Sept. 1958, pp. 179 and 180.